United States Patent [19]
Mugitani

[11] Patent Number: 5,847,659
[45] Date of Patent: Dec. 8, 1998

[54] ELECTRONIC WIRING SYSTEM USING AUTOMATIC CYCLIC, COMMUNICATION MEANS

[75] Inventor: Tomihiro Mugitani, Saitama-ken, Japan

[73] Assignee: Step Technica Co., Ltd., Saitama-ken, Japan

[21] Appl. No.: 775,877

[22] Filed: Jan. 2, 1997

[30] Foreign Application Priority Data

Jun. 7, 1996 [JP] Japan .................................. 8-145648

[51] Int. Cl.⁶ .................................................. H04Q 1/00
[52] U.S. Cl. ........................................... 340/825.29
[58] Field of Search ...................................... 340/825.28

[56] References Cited

U.S. PATENT DOCUMENTS 4,823,122  4/1989  Mann et al. ..................... 340/825.28

*Primary Examiner*—Robert B. Harrell
*Assistant Examiner*—David M. Ovedovitz
*Attorney, Agent, or Firm*—Nikaido, Marmelstein, Murray & Oram LLP

[57] ABSTRACT

An electronic wiring system using automatic cyclic communication means in which having a center apparatus including a "state machine capable of controlling the receiving-and-transmitting of data by driving associated circuits without recourse to communication control programs, and a memory to store data; and a plurality of terminal devices connected to the center apparatus via a digital communication line. Each terminal device is connected to an associated object to be controlled by the center apparatus, and has no microcomputer associated therewith. The terminal device is capable of self addressability. Each data bit group in the memory of the center apparatus is structurally same as the data bit group in the I/O port of the terminal device.

8 Claims, 11 Drawing Sheets

ELECTRONIC WIRING SYSTEM USING AUTOMATIC CYCLIC, COMMUNICATION MEANS

BACKGROUND OF THE INVENTION

1. Field of the Invention

The present invention relates to a control system comprising a control center or controller including a microprocessor and a memory and a plurality of devices to be controlled by the control center or controller, each device has no microprocessor associated therewith, and more particularly to an "electronic wiring system using automatic cyclic communication means" in which writing-and-reading is effected cyclically in the memory of the control center or controller with the aid of "state machine" (sequential logic circuit means) in communication between the controlling center or controller and each of the controlled devices, not requiring any programmed control.

Data communication using "electronic wiring system" is opposite in sense to a conventional data communication using programmed protocol among distributed microprocessors, and the proposed protocol-free data communication system permits the sending and receiving of data using memory means, which would be like electric wires connecting the control center to each controlled device.

2. Description of Related Art

Computer-aided control systems and automation systems have been widely used in a variety of fields such as building maintenance, plant control, automatic production and inspection lines in factories using conveyors, physical distribution, nurse calling equipment in hospitals, automations for home use, security equipments or signal controls in a large-scaled installation such as printing machine, machining apparatus, semiconductor manufacturing system or robot-installed factory.

There are two data sending-and-receiving methods. The first data sending-and-receiving method is illustrated in FIG. 13. I/O ports 60 of a center microprocessor are connected to distributed objects to be controlled by wires 61, thereby inputting and outputting required data between each object and the center microprocessor.

The second data sending-and-receiving method is illustrated in FIG. 14. No I/O ports 60 are used. Each controlled object has an auxiliary microprocessor 62 associated therewith, and each auxiliary microprocessor 62 is connected to the center microprocessor via a common communication line 63, thereby permitting the sending-and-receiving of required data between each controlled object and the center microprocessor.

This second method requires that data exchange be effected according to a given protocol. Specifically, the auxiliary microprocessor 62 sends a detection signal to the center microprocessor, and the center microprocessor responds to the detection signal by sending operation command signal to the originating auxiliary microprocessor 62. The typical example of automation is illustrated in the sequence diagram of FIG. 15.

Referring to FIG. 15, assume that a detection signal is sent from a selected object to its auxiliary microprocessor at time t0. In certain length of time, which is determined from the instantaneous condition of the center microprocessor, it permits the auxiliary microprocessor to start communication at time t1 (ENQ: Enquiry). The auxiliary microprocessor receives "ENQ" at time t2, and after required protocol analysis is effected the auxiliary microprocessor sends "ACK" (Acknowledgment) at time t3. The center microprocessor receives "ACK" at time t4, and sends DATA REQUEST COMMAND at time t5. The auxiliary microprocessor receives the command at time t6, and sends data (DATA) to the center microprocessor at time t7.

The center microprocessor receives data at time t8 to effect protocol analysis and detect data, and then, the center microprocessor sends Acknowledgment of data (ACK) at time t9. The auxiliary microprocessor receives ACK at time t10, thereby confirming that required data transfer is completed without fail, and the controlled object is allowed to work at time t11.

Assume that the controlled object is a brake device for a given rotating object. It takes the length of time from t0 to t11 for the brake device to stop the rotating object after the associated auxiliary microprocessor has received the detection signal from the rotating object. A conventional communication apparatus RS-232 can transfer data at the rate of 19,200 bps, and the length of time involved for data transfer ranges from several tens to several hundreds of seconds. Because of such an inconstant length of time the rotating object cannot be made to stop at controlled position.

Another conventional inter-microprocessor data exchange method uses a common memory and an associated arbiter, which permits a selected microprocessor to gain access to the common memory for reading the data written by another selected microprocessor, and individual microprocessors to write data alternately in a same address of the common memory.

This data exchanging method using a memory in common is very satisfactory if microprocessors are positioned relatively close to each other. However, if microprocessors are positioned so far that inter-microprocessor bus conductors run such a long distance that surrounding noises or burst errors may appear, adverse effects are liable to be caused on microprocessors' operations. In this connection data exchange can be permitted within certain limited distance.

In an attempt to overcome such a problem of inter-microcomputer distance limitation the inventor proposed a new communication system which permits the responding-and-working of controlled objects as would be provided if distant-located microprocessors were connected by electric wires simply in spite of each microprocessor's gaining access to the common memory in an ordinary way (see Japanese Patent 3-260857(A)).

As for the first data sending-and-receiving method (FIG. 13) it has following defects:

1) the size of the center microprocessor cannot be reduced because it must be equipped with anti-noise means, signal converter means and connectors;

2) a lot of electric wires are required in connecting the center microprocessor to the objects to be controlled, and therefore, a large space is required, and the wiring cost is high;

3) appearance of a single defective signal may lead to the stopping of the whole system;

4) the capacity of the center microprocessor and the electric power to be loaded thereon limit the amount of signals to be handled;

5) the testing of the data sending-and-receiving system is hardly possible with recourse to simulation, and therefore, the study and development require much time; and 6) the maintenance work is so difficult that maintenance engineers are required to have as much knowledge as research workers or experts.

As for the second data sending-and-receiving method (FIG. 14) it has following defects:

1) programs must be prepared for not only the center microprocessor but also auxiliary microprocessors, and much time and cost are involved for preparing such programs;

2) the running condition of each auxiliary microprocessor must be watched, and this causes extra burden in maintenance;

3) communication between the center microprocessor and each auxiliary microprocessor requires such a complicated protocol that communication rate cannot be increased and no simultaneous or two-way communication is permitted between the center microprocessor and a selected auxiliary microprocessor, accordingly causing the elongation of time in communication, and still disadvantageously, data transfer rate cannot be raised beyond the rate at which the auxiliary microprocessor can handle the protocol;

4) the system controlling program for the center microprocessor contains a communication controlling program, and accordingly an increasing amount of program must be prepared;

5) it is very difficult to make a decision as to which side of center microprocessor or auxiliary microprocessor has a cause for malfunction when it appears in the data sending-and-receiving system;

6) the center microprocessor must be synchronized with each auxiliary microprocessor at the outset of the data sending-and-receiving system, and therefore, it is difficult to deal with the system at the time of power failure or abnormal running;

7) extra designing is required in producing auxiliary microprocessors, and accordingly extra cost and time is involved;

8) the testing of the data sending-and-receiving system is almost impossible with recourse to simulation, and therefore, the study and development requires much time; and 9) the maintenance work is so difficult that maintenance engineers are required to have as much knowledge as research workers or computer designers.

To meet the social need of automatization in different fields there has been a tendency of rapidly increasing computer-aided control systems each comprising a control using a microprocessor such as a personal computer, and a variety of objects to be controlled such as sensors, switches, lamps, actuators or other devices having no microprocessors. Therefore, there is an ever increasing demand for wiring systems or data exchanging systems appropriate for use in such computer-aided control systems, which wiring or data exchanging systems are less expensive, simple to make, easy in maintenance and convenient for study or development, and fast and reliable in operation.

SUMMARY OF THE INVENTION

To meet such demands an automatic, cyclic communication type of "electronic wiring" system including an intelligent control center having a microprocessor associated therewith and a plurality of non-intelligent objects to be controlled each having no microprocessor associated therewith as shown in Japanese Patent Application Laid-Open No. 3-260857 is so improved that: 1) less expensive and simpler structure may be provided; 2) maintenance is easy; and 3) inter-connections of circumferential devices of the microprocessor are standardized.

To attain these objectives an improved automatic, cyclic communication type of "electronic wiring" system according to the present invention comprises a control center including a "state machine" which is capable of controlling the sending and receiving of data through the driving of associated circuits, not requiring any programs, and a memory to store data; and a plurality of terminal devices connected to the control center via digital communication lines, each terminal device being capable of providing data format with an address allotted thereto. Grouped data bit arrangements stored in the common memory of the control center is same as grouped data bit arrangements stored in the I/O port of each terminal device.

Data bit group in the common memory of the control center has following features: data bit groups being stored in different areas allotted to individual terminal devices; the common memory of the control center being driven separately by data-sending memory and by data-receiving memory; the data bit group stored in an area allotted to each terminal device being set in a sending or receiving field unit, thereby permitting the sending or receiving of data in the sending or receiving field unit thus set; the sending or receiving field unit being composed of start pattern, destination address, originating address, data to be transferred and check code; and the memory of the control center being a dual port RAM or the like. The control center is formed of IC chips, and the "state machine" comprises sending and receiving circuits for sending and receiving data in the form of digital communication, sequencers for controlling data sent and received by the sending and receiving circuits, and an arbiter circuit for controlling the writing and reading of dispatched and received data in the common memory of the control center.

This arrangement makes the common memory of the control center apparently equivalent to the I/O port of each terminal device, and therefore, all data representing the instantaneous condition of a selected terminal device can be obtained by gaining access to the common memory of the control center, and necessary commands can be given to a selected terminal device simply by writing command data in the common memory of the control center, thus assuring the quick, reliable transfer of data to the selected terminal device.

Data can be transferred automatically cyclically between the control center and a selected terminal device, for instance according to the duplex system, and the data transfer can be effected very quickly or almost instantaneously because of no necessity of processing according to protocol program. Thus, a series of events, that is, the control center realizing the instantaneous condition of a selected terminal device; an appropriate command being dispatched to the selected terminal device; and accordingly the selected terminal device performing a required operation, can be conducted in a possible minimum time.

Still advantageously little or no consideration is required for delay of signals travelling from the control center to a selected terminal device, and for noise effect on signals on the way to the selected terminal device.

A single digital communication line extends from the control center to each terminal device, which is connected to the communication line by an associated multidrop branch, and therefore, the wiring is simple, compared with the conventional data sending-and-receiving system. If a full duplex system is adopted, its digital communication line will be of a four-core cable, and therefore, the communication line can be laid at a minimum cost, requiring only a small space for installation. If a half-duplex system is adopted, its digital communication line will be of a two-core cable.

Each terminal device has no microprocessor associated therewith, and therefore, the system is free of all troubles pertaining to hardware and software as described above in connection with the second data sending-and-receiving method.

Other advantages of the present invention will be understood from the following description of automatic, cyclic communication systems according to preferred embodiments of the present invention, which are shown in accompanying drawings.

DESCRIPTION OF THE PREFERRED EMBODIMENTS

Now, an automatic, cyclic communication system using an "electric wiring system" according to the present invention is described below in the order of:

I) an automatic, cyclic communication system according to a first embodiment;
  1. center apparatus 1
  2. terminal device 2
  3. digital communication line 3
  4. operation
  5. first example
  6. second example II) an automatic, cyclic communication system according to a second embodiment; and III) an automatic, cyclic communication system according to a third embodiment.

Figure 1:
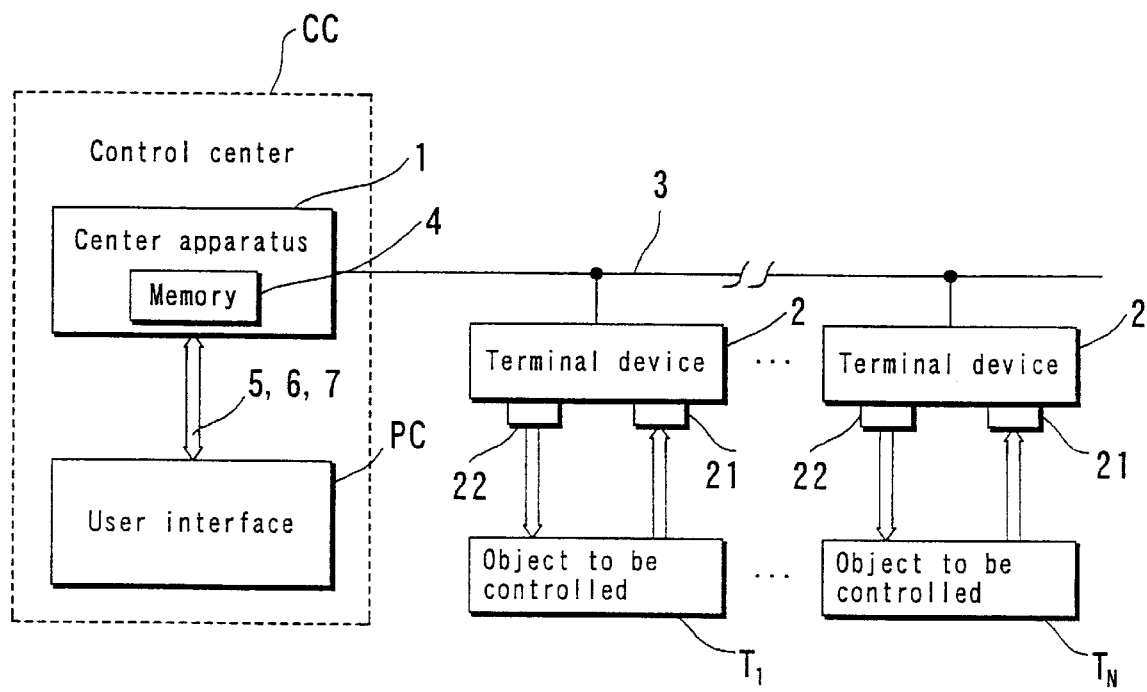
FIG. 1 shows an automatic, cyclic communication system according to a first embodiment of the present invention.

I) an automatic, cyclic communication system according to a first embodiment:

As seen from FIG. 1, an automatic, cyclic communication system according to a first embodiment comprises: a control center CC which comprises a center apparatus 1 comprising a common memory and a "state machine", and a user interface PC connected to the center apparatus 1; and a plurality of terminal devices 2 each connected to each of the terminal objects T1- T N to be controlled by the control center CC. Each terminal object has no microprocessor associated therewith. These "N" terminal devices 2 are connected to the center apparatus 1 by a single digital communication line 3. The number "N" of the terminal objects to be controlled is called hereinafter the "running number". The center apparatus 1 and each terminal device 2 are composed of IC chips.

Each terminal device 2 is connected to the center apparatus 1 according to the multidrop system, which makes a required connection by using a differential transmission driver/receiver and a pulse transformer.

The center apparatus 1 has a common memory 4 connected to the user interface PC (personal computer and the like) via an address bus 5, a data bus 6 and a read/write control line 7, thereby permitting free access to the common memory 4 through the user interface PC.

Also, each terminal device 2 is permitted to have an automatic, cyclic access to the common memory 4 via an automatic communication circuit (i.e. the "state machine"), as later described.

Access is allowed to the common memory 4 of the center apparatus 1 both from the user interface PC and from each terminal device 2 via the digital communication line 3.

All terminal devices 2 are of same structure, and are given addresses 1 to N so that they may be identified in terms of address. Every terminal device 2 has no microprocessor associated therewith, but it has an "m"-bit input port 21 and an "n"-bit output port 22 both connected to an associated terminal object T1-TN, sending/receiving function, sequencer function and address verification function.

Assume that a selected terminal device 2 having an object Ti associated therewith receives a command packet from the center apparatus 1, the command packet being composed of a group of data bits bearing an address "i". Then, the text data contained in the command packet are outputted from the output port 22 of the terminal device 2 to the object Ti whereas data inputted to the input port 21 of the terminal device 2 are outputted to the center apparatus 1 via the digital communication line 3 when the terminal device's turn comes round.

Figure 2:
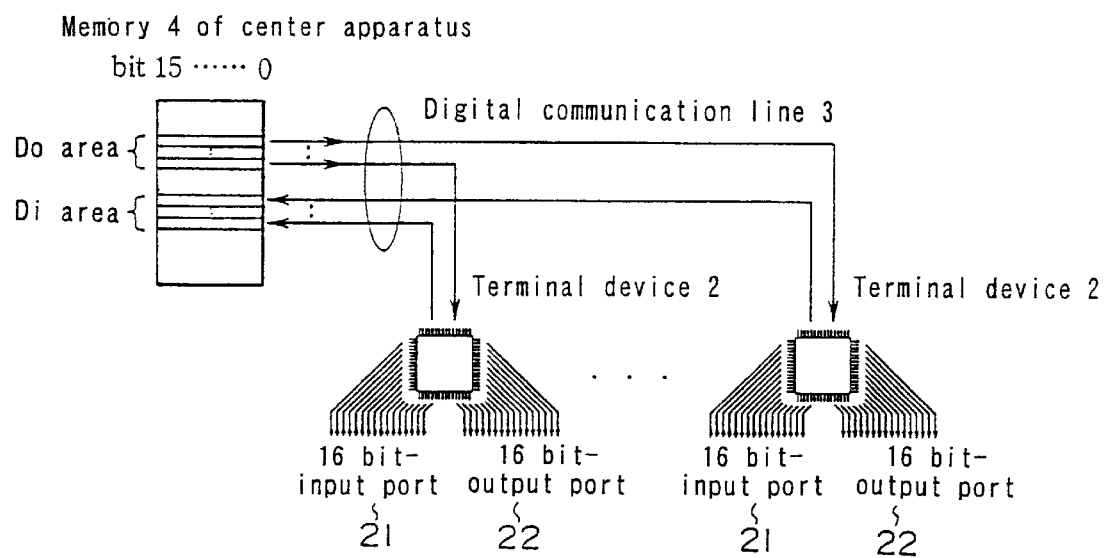
FIG. 2 shows how the common memory is used in the automatic, cyclic communication system.

Required data transfer is effected between the user interface PC and each of the terminal objects T1-TN via the common memory 4 of the center apparatus 1, as shown in FIG. 2.

The common memory 4 has an output data storage area D0, an input data storage area Di an error area.

Area D0 is composed of an "N" number of m-bit memory registers (m=16 in FIG. 2), each bit position of the "i"th memory register being in the one-to-one corresponding relation with each bit position of the output port 22 of the terminal device 2 connected to the "i"th object T i to be controlled.

Area Di is composed of an "N" number of n-bit memory registers (n=16 in FIG. 2), each bit position of the "i"th memory register being in the one-to-one corresponding relation with each bit position of the input port 21 of the terminal device 2 connected to the "i"th object Ti to be controlled.

The error area has error memory addresses allotted to all terminal devices 2, thereby responding to detection of errors if any in the data received from a selected terminal device 2 to write a predetermined code in the address allotted to the selected terminal device.

FIG. 2 shows an "N" number of conductors in one and the other direction respectively in the digital communication line 3 only for the sake of convenience in description. This particular embodiment uses a full-duplex system, and therefore, the digital communication line 3 contains four electric wires. Two electric wires are allotted for sending data from the center apparatus 1 to a selected terminal device 2 whereas the remaining two electric wires are allotted for sending data from a selected terminal device 2 to the center apparatus 1.

Figure 3:
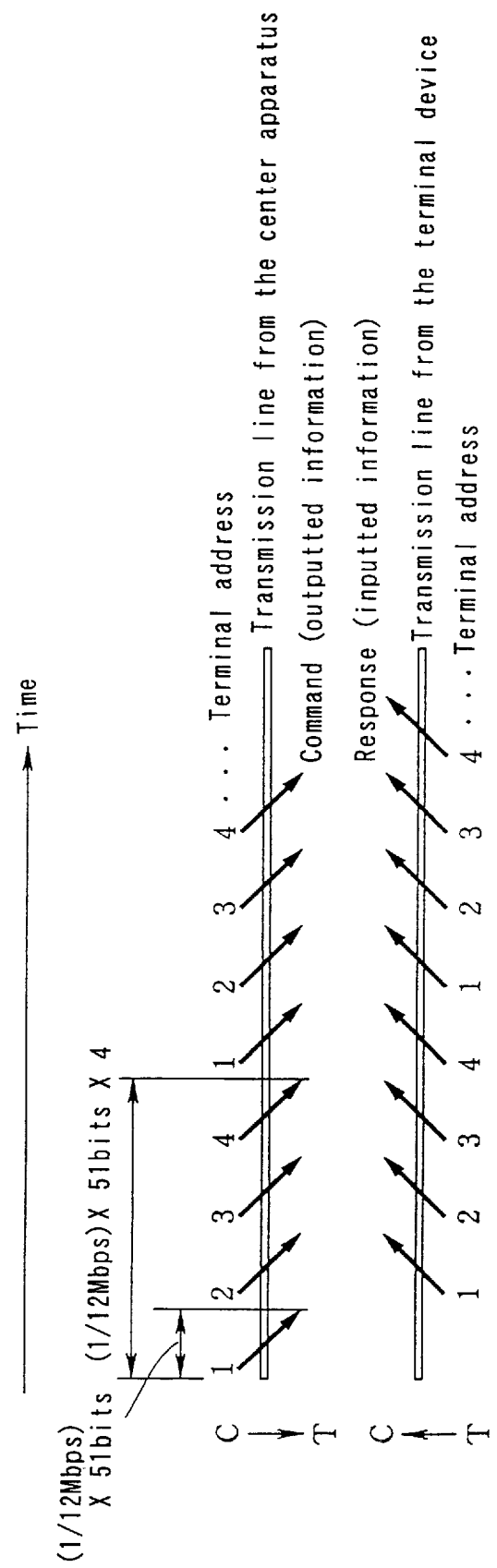
FIG. 3 illustrates an example of full-duplex communication in the automatic, cyclic communication system.

FIG. 3 shows how a required communication can be effected according to the full-duplex system for N=4. As shown in the drawing, the center apparatus 1 puts a single field of command packet, which is constructed from a possible minimum bit length, on the digital communication line in automatic, periodic mode.

A selected terminal device receives a command packet addressed thereto, and immediately it sends back to the center apparatus 1 a single field of response packet, which is constructed from a possible minimum bit length (see FIG. 5), by the digital communication line.

Figure 4:
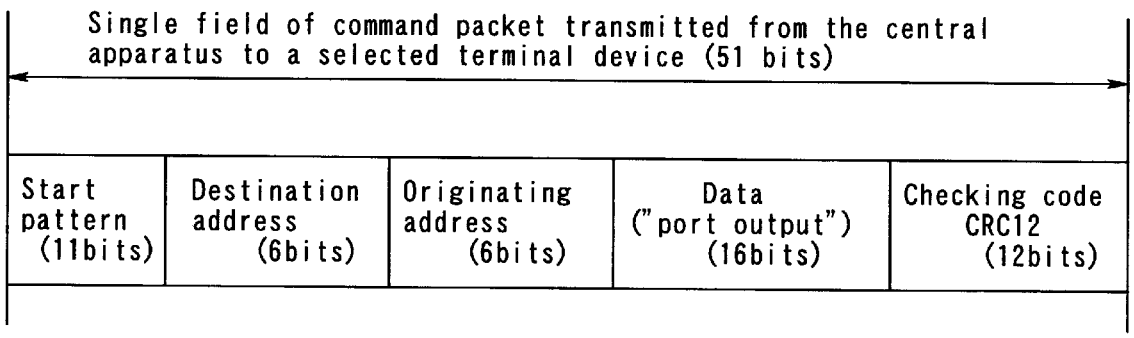
FIG. 4 shows the format of a command packet used in the automatic, cyclic communication system.
Figure 5:
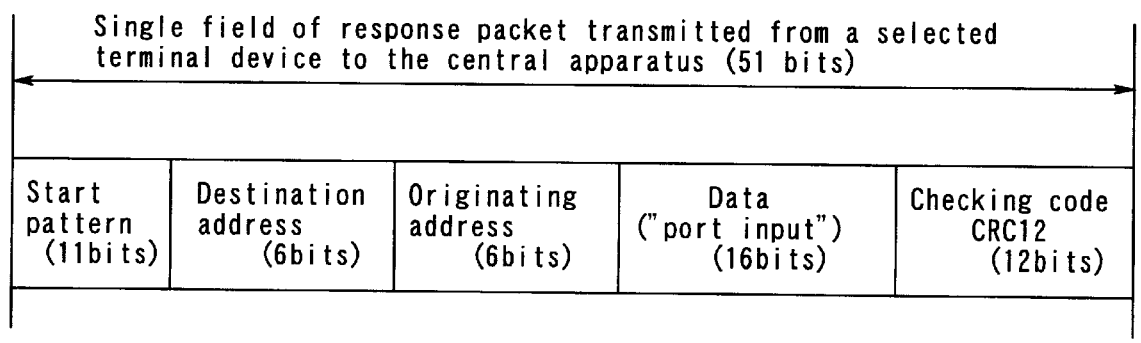
FIG. 5 shows the format of a response packet used in the automatic, cyclic communication system.

As seen from FIGS. 4 and 5, one field of command or response packet is composed of: START PATTERN; DESTINATION ADDRESS; ORIGINATING ADDRESS; TRANSFERRED DATA; and CHECK CODE (CRC code).

The data contained in a command packet having "i" as destination address is called "port output" from the output port 22 of the terminal device 2i to the controlled object Ti (see FIG. 2) whereas the data contained in a response packet having "i" as originating address is called "port input" from the controlled object Ti to the input port 21 of the terminal device 2i (see FIG. 2).

In the so constructed "electronic wiring system" each and every bit in the common memory 4 correspond to each and every bit in the input and output ports 21 and 22 of each terminal device 2 in one-to-one corresponding relation automatically at the transmission rate. Specifically the data bit group in the memory of the center apparatus corresponds structurally to the data bit group in the I/O port of the terminal device. The user's interface PC is coupled to each controlled object Ti automatically periodically, and apparently it looks like direct connection between the user's interface PC and each controlled object Ti by electric wires, and hence it is called "Electronic Wiring System Using Automatic, Cyclic Communication Means".

The first embodiment is described below in the order of: (1) Center Apparatus; (2) Terminal Device; (3) Digital Communication Line; (4) Operation; (5) First Example and (6) Second Example.

1) Center Apparatus

Figure 6:
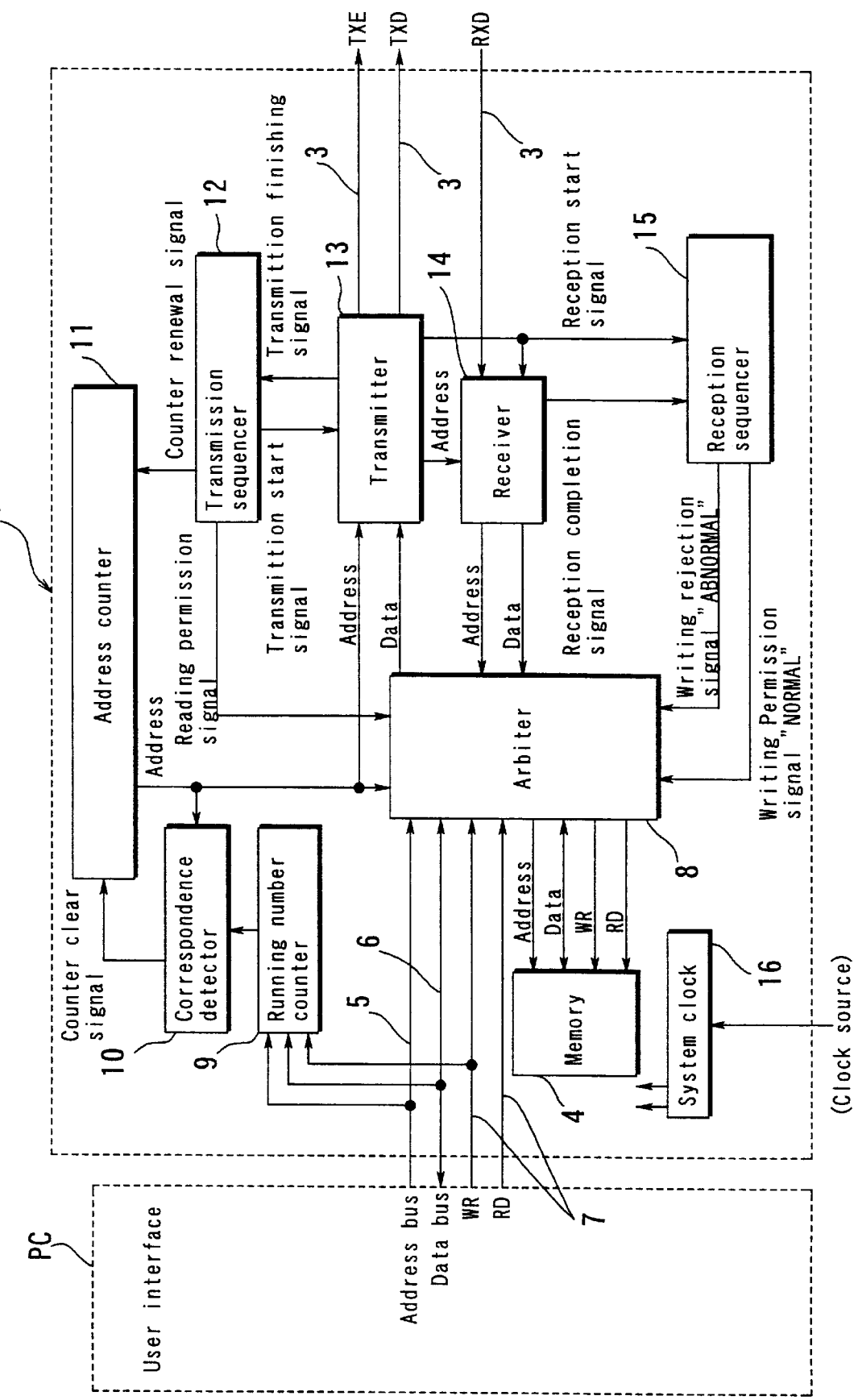
FIG. 6 shows some details of the center apparatus of the automatic, cyclic communication system.

As shown in FIG. 6, the center apparatus 1 comprises a common memory 4 and a "state machine", which comprises an address bus 5, a data bus 6, a read/write control line 7, an arbiter 8, a "running number" register 9, a correspondence detector 10; an address counter 11; a transmission sequencer 12; a transmitter 13; a receiver 14; a reception sequencer 15 and a system clock 16.

The address bus 5, the data bus 6 and the read/write control line 7 are connected to the microprocessor of the user's interface PC at one ends, and to the arbiter 8 and the "running number" register 9 at the other ends.

The arbiter 8 is connected to the user's interface PC by the address bus 5, the data bus 6 and the read/write control line 7, and is connected to the memory 4 by the address line, data line, WR line and RD line. Also, the arbiter 8 is connected to the address counter 11, the transmission sequencer 12, the transmitter 13, the receiver 14, the reception sequencer 15 and the system clock 16. The arbiter 8 works as follows:

(1) the user's interface PC sends an address signal and a read/write signal to the arbiter 8 via the address bus 5 and the read/write control line 7 respectively to allow: the user to gain access to required data stored in the common memory 4, thereby outputting the data to the arbiter 8 via the data bus 6; or the user to write data in the common memory 4 via the data bus 6;

(2) the arbiter 8 is responsive to a memory signal from the transmission sequencer 12 and an address signal from the address counter 11 for gaining access to the common memory 4 to output selected data to the transmitter 13;

(3) the arbiter 8 is responsive to a memory access permission signal, "NORMAL" from the reception sequencer 15 and an address signal from the receiver 14 for writing the received data at the designated address of the common memory 4; and (4) the arbiter 8 is responsive to a memory access rejection signal, "ABNORMAL" from the reception sequencer 15 and an address signal from the receiver 14 for writing the error code at the designated address of the common memory 4.

The "running number N" is set in the "running number" register 9 by the user's interface PC for outputting the so set value "N" to the correspondence detector 10.

The correspondence detector 10 compares the number of addresses from the address counter 11 with the running number "N" from the "running number" register 9, and is responsive to agreement therebetween for outputting a counter clear signal to the address counter 11. Thus, the "running number" register 9 and the correspondence detector 10 function together to allow the address counter 11 to count 1 to N repeatedly.

The address counter 11, the transmission sequencer 12, the transmitter 13, the receiver 14 and the reception sequencer 15 together make up an automatic communication circuit.

The address counter 11 counts 1 to N in a predetermined period repeatedly, outputting the instantaneous count value to the arbiter 8, the correspondence detector 10 and the transmitter 13.

For the purpose of timing transmission of command packets from the center apparatus 1 to each subsequent terminal device 2 opportunely the transmission sequencer 12 works as follows:

(1) the transmission sequencer 12 is responsive to a transmission completion signal from the transmitter 13 (indicating completion of the sending of a single field of command packet) to output a counter renewal signal to the address counter 11 for renewing the same, and then, the address counter 11 provides a new address to the arbiter 8, the correspondence detector 10 and the transmitter 13;

(2) the transmission sequencer 12 sends a transmission start signal to the transmitter 13 to allow it to begin the sending of a single field of command packet via the digital communication line 3; and (3) simultaneously with the sending of the counter renewal signal to the address counter 11, the transmission sequencer 12 sends a memory access signal to the arbiter 8, thereby permitting the arbiter 8 to gain access to the common memory 4 at the renewed address for outputting a required data via the transmitter 13.

The transmitter 13 works as follows:

(1) the transmitter is responsive to the transmission start signal from the transmission sequencer 12 for composing a single field of command packet (see FIG. 4) from the address inputted from the address counter 11, data inputted from the arbiter 8 and the CRC code for outputting the so composed command packet via the digital communication line 3; and (2) the transmitter sends a transmission finishing signal to the transmission sequencer 12 at completion of transmission of the single field of command packet via the digital communication line 3, and at the same time it sends: a reception start signal both to the reception sequencer 15 and the receiver 14; and the destination address to the receiver 14.

The receiver works as follows:

(1) the receiver 14 is responsive to the reception start signal from the transmitter 13 to be reset inside for receiving the single field of response packet, which is sent from the terminal device 2 whose address is the one preceding the address just provided from the transmitter 13; and (2) as to the received response packet the receiver makes a decision as to whether it contains any bit errors according to the CRC code and whether the originating address is agreed, and is responsive to detection of normal condition for preparing the outputting of the received address and data to the arbiter 8, and for sending a reception termination signal to the reception sequencer 15; and (3) in case of absence of response signal from the addressed terminal device 2 or in case of detection of abnormal condition by the CRC checking the receiver does not send a reception termination signal to the reception sequencer 15.

The reception sequencer 15 works as follows:

(1) the reception sequencer 15 is responsive to the reception start signal from the transmitter 13 for waiting for the reception termination signal from the receiver 14, and is responsive to the reception termination signal for sending the writing permission signal, "NORMAL" to the arbiter 8, thereby allowing the receiver 14 to output the address and data to the arbiter 8, which permits the writing of the data at the address of the common memory 4;

(2) in case that the reception sequencer 15 receives no reception termination signal from the receiver 14 for the period running from the receipt of the reception start signal to the subsequent reception start signal from the transmitter 13 the reception sequencer 15 sends the writing rejection signal, "ABNORMAL" to the arbiter 8 to write a predetermined code at the error address of the common memory 4; and (3) subsequent to the sending of the writing permission signal, "NORMAL" or the writing rejection signal, "ABNORMAL" the reception sequencer 15 is put in the stand-by position for starting the subsequent reception.

The system clock 16 is responsive to clock signals from an exterior clock signal generator for sending timing signals to different parts of the center apparatus 1.

2) Terminal Device

Figure 7:
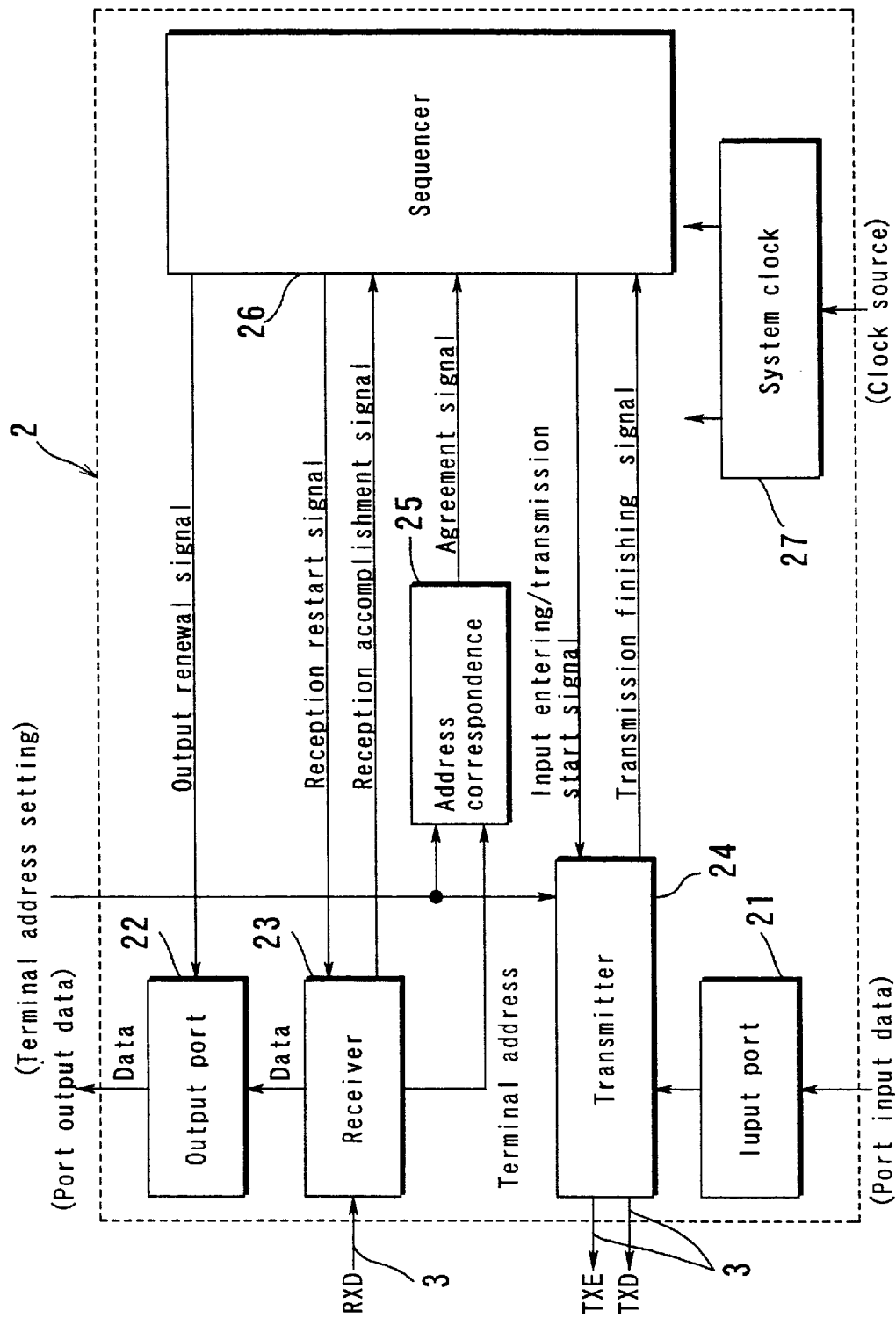
FIG. 7 shows some details of a selected terminal device of the automatic, cyclic communication system.

As seen from FIG. 7, the terminal device comprises an input port 21, an output port 22, a receiver circuit 23, a transmitter circuit 24, an address reference circuit 25, a sequencer circuit 26 and a system clock 27.

The terminal device 2 is equipped exteriorly with a terminal address setting unit by which a user can provide the transmitter circuit 24 and the address reference circuit 25 with his address.

Input data is inputted from an associated controlled object T to the input port 21.

Received data is inputted from the receiver circuit 23 to the output port 22, and the so inputted data is outputted to the controlled object T as "port output data".

The receiver circuit 23 works as follows:

(1) the receiver circuit 23 is responsive to the reception start signal from the sequencer circuit 26 for starting reception, and when receiving a single field of command packet from the transmitter circuit 13 of the center apparatus 1, the receiver circuit 23 effects the checking of the received signal according to the CRC code to output the reception accomplishment signal to the sequencer circuit 26 if no errors are detected, and at the same time, output the "port output data" to the output port 22; and (2) the destination address is picked up from the single field of command packet thus received, and then, the destination address is outputted to the address reference circuit 25;

The transmitter circuit 24 works as follows:

(1) the transmitter 24 is responsive to the data entering/ data transmission starting signal from the sequencer circuit 26 for composing a single field of response packet from the address thereof and the "port input data", which is supplied via the input port 21, and the so composed response packet is sent via the digital communication line 3; and (2) when transmission of the single field of response packet is completed, the transmitter 24 sends a transmission finishing signal to the sequencer circuit 26.

The address reference circuit 25 compares the address inputted from the receiver circuit 23 with the address already set by the terminal address setting unit to determine whether the so received command packet is addressed to the very exact terminal device, and in the affirmative case the address reference circuit 25 sends to the sequencer circuit 26 an agreement signal indicating that the command packet is addressed to the very exact terminal device.

The sequencer circuit 26 works as follows:

(1) the sequencer 26 is responsive to the agreement signal from the address reference circuit 25 (that is, confirmation of the received command being addressed to the very exact terminal device) and the reception accomplishment signal from the receiver circuit 23 for outputting an output renewal signal to the output port 22, thus permitting the outputting of the received data from the output port 22 to the associated controlled object as "port output data";

(2) upon confirmation of the received command being addressed to the very exact terminal device the sequencer 26 sends the data entering/data transmission starting signal to the transmitter circuit 24, thereby permitting the transmitter 24 to compose a response packet from the "port input data" inputted from the input port 21 for sending the response packet via the digital communication line 3;

(3) upon receipt of the reception accomplishment signal from the receiver 23 but no agreement signal from the address reference circuit 25 the sequencer 26 makes a decision that the received signal is not addressed to the very exact terminal device, disregarding the reception of signal and outputting the reception restart signal to the receiver 43 for waiting for another subsequent signal; and (4) the sequencer 26 finishes a single process when receiving the transmission finishing signal from the transmitter 24, and it functions repeatedly as described in (1), (2) and (3).

The system clock 27 provides all circuits of the terminal device 2 with clock signals.

Figure 8:
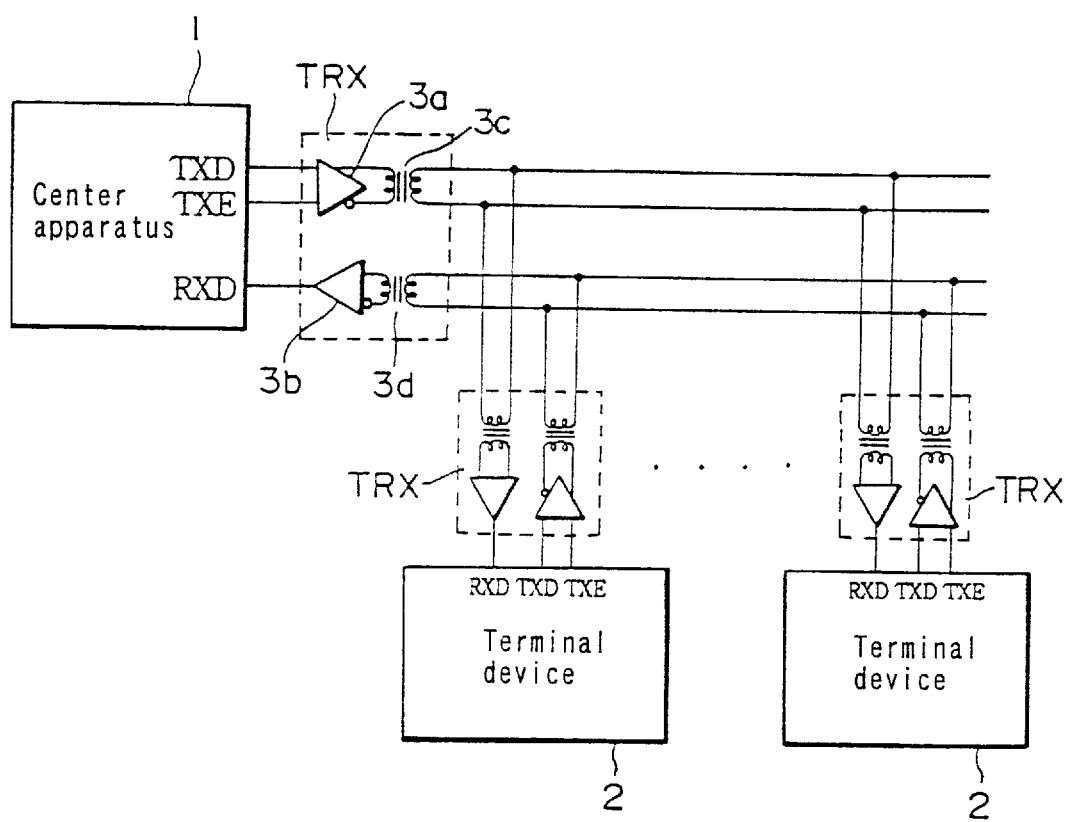
FIG. 8 shows some details of the digital communication line.

3) Digital Communication Line:

As seen from FIG. 8, the center apparatus 1 and each terminal device 2 are connected by the digital communication line 3 according to the multidrop system, using TRXs each comprising a driver 3a, a receiver 3b and associated pulse transformers 3c and 3d.

The pulse transformers 3c and 3d isolate electrically terminal devices from each other, thus permitting the electric power source of each terminal device to turn on and off independently.

4) Whole Operation:

The "electronic wiring system using automatic cyclic communication means works as follows:

(1) in the center apparatus 1 the address counter 11 renews its count in response to the count renewal signal from the sequencer circuit 12, outputting the address "i" (i=1 to N) of the destination terminal device 2, and then, the sequencer 12 sends a memory access signal to the arbiter 8 and a transmission start signal to the transmitter 13;

(2) arbiter 8 responds to the memory access signal to read the piece of data from the "i"th memory register of AREA Do of the common memory 4 for sending the so read data to the transmitter 13;

(3) the transmitter 13 responds to the transmission start signal to start preparation of transmission, composing a single field of command packet from the destination address "i" supplied from the address counter 11 and the data supplied from the arbiter 8 to send the so composed command packet via the digital communication line 3;

(4) when completing the sending of the command packet the transmitter 13 sends the transmission finishing signal to the transmission sequencer 12, and at the same time, the transmitter 13 sends the reception start signal to the receiver 14 and the reception sequencer circuit 15;

(5) the terminal device whose address is (i-1) receives a command packet addressed thereto at the period which precedes the current period (such period being equal to that at which the center apparatus 1 sends a command packet to the terminal device whose address is "i"), and at the same time, the terminal device composes a single field of response packet from the "port input data" and the originating address (i-1) to send the so composed response packet to the center apparatus 1 via the digital communication line 3;

(6) the receiver circuit 14 of the center apparatus 1 receives the response packet from the (i-1)th terminal device 2 to send a reception finishing signal to the reception sequencer circuit 15, if the received signal is checked to be found normal, or otherwise, not;

(7) the reception sequencer circuit 15 of the center apparatus 1 responds to the reception finishing signal to send a writing permission signal, "NORMAL" to the arbiter 8, and otherwise, it sends a writing rejection signal, "ABNORMAL" to the arbiter 8;

(8) the arbiter 8 responds to the signal, "NORMAL" to write the received data in the (i-1)th memory register of the area Di of the common memory 4, or the arbiter 8 responds to the signal, "ABNORMAL" to write a predetermined code in an area allotted to the originating terminal device in the common memory 4; and (9) a sequence of functions (1) to (8) described above are effected between the center apparatus 1 and a selected terminal device 2. Any other terminal device remains dormant because no command packet is addressed.

At the subsequent period the count of the address counter 11 increases one, and then the sequence of functions (1) to (8) are repeated until the count "i" has reached "N". When the count has reached "N", the subsequent address will be "1", again.

Assuming that the "electronic wiring system using automatic cyclic communication means" works by using the full-duplex system as described above, the length of time involved for whole operation is reduced to minimum for the following reasons:

The required control can be effected without the agency of microcomputers each associated with each terminal device, and therefore the processing speed and data transfer rate can be increased independent of the processing capability of such a microprocessor.

For example, assume that the data transfer rate is 12 Mbps, and then, the length of time involved for transmitting a single field of command packet comprising 51 bits can be calculated as follows:

$(1/12 \text{ Mbps}) \times 51 \text{ bits} = 4.25 \ \mu\text{sec.}$

The whole length of time involved for letting the four terminal devices 2 to work, therefore, can be calculated as follows:

$4.25 \ \mu\text{sec.} \times 4 \text{ fields} = 17 \ \mu\text{sec.}$

The practical length of time involved for the inputting/outputting of data in a conventional computer-aided control is about 1 msec. The transmission time of 17 $\mu$sec. in the present computer-free control system is practically zero, compared with the conventional computer-aided control system.

Figure 9:
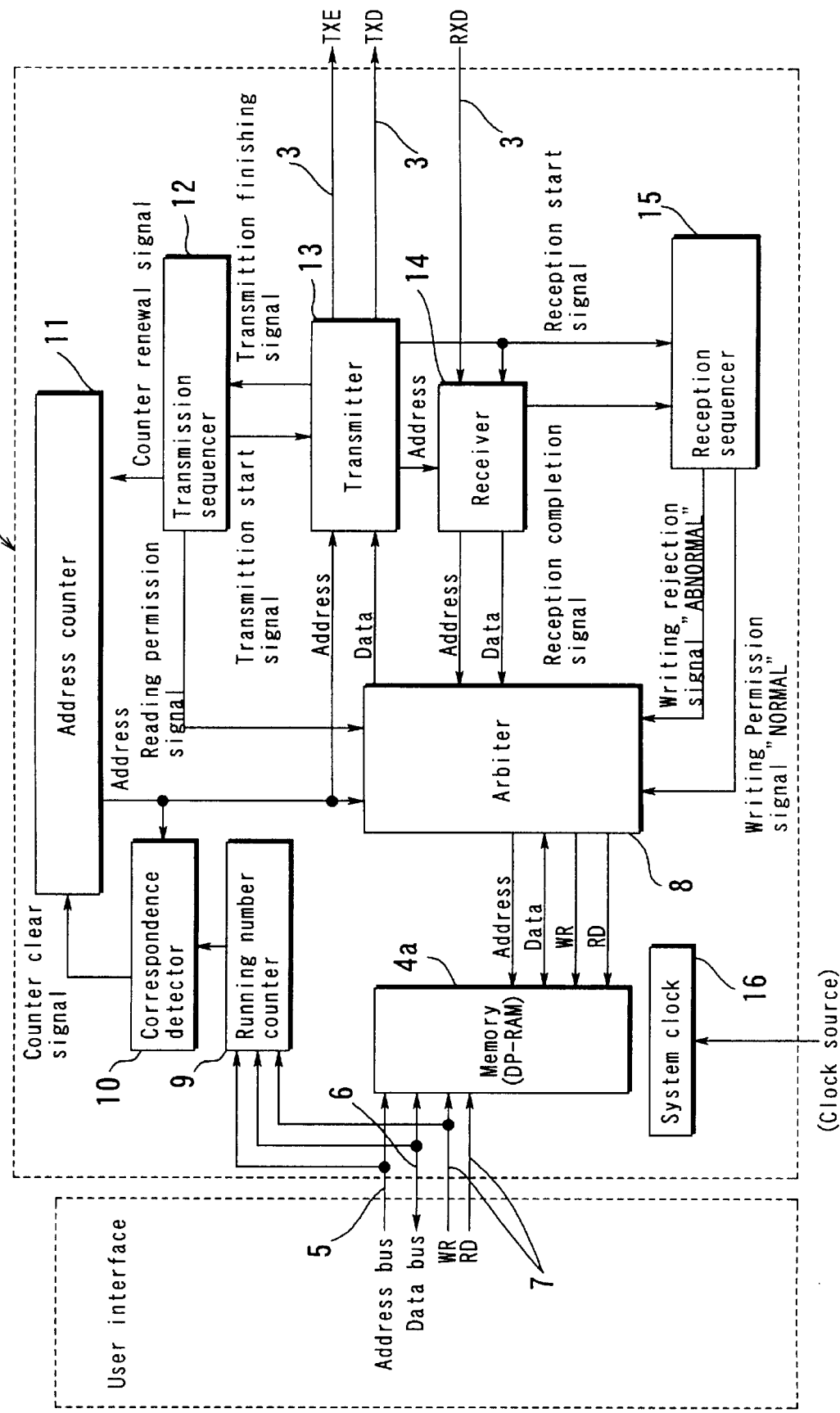
FIG. 9 shows some details of another example of center apparatus.
Figure 10:
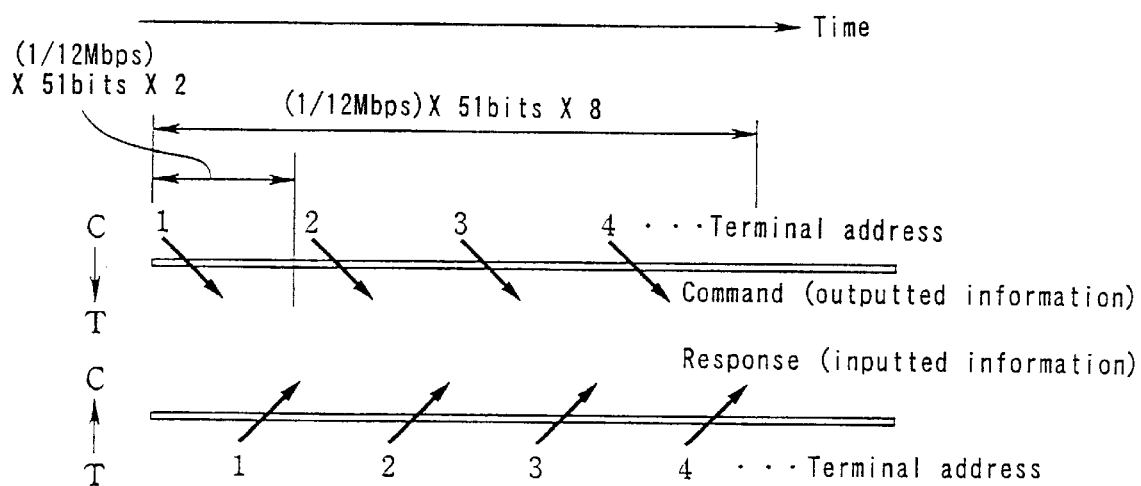
FIG. 10 shows another example of automatic, cyclic communication system.

II) Automatic, Cyclic Communication System According to a Second Embodiment:

Referring to FIGS. 9 and 10, an automatic, cyclic communication system according to a second embodiment uses a DP-RAM (dual-port RAM) 4a in its center apparatus 1a. FIG. 9 uses the same reference numerals to indicate the same parts as in FIG. 6.

As shown in the drawing, a user's interface PC is connected to the center apparatus 1a, particularly to the common memory 4a by an address bus 5, a data bus 6 and a read/write control line 7, thus permitting the user to gain access directly to the common memory 4a via the user's interface PC. Accordingly the burden which the "state machine" or arbiter 8a bears can be reduced.

The communication between the center apparatus 1a and each of N terminal devices 2 uses a half-duplex system. Of course, it can use a full-duplex system as is the case with the first embodiment.

The terminal device 2 can work in the same way as the one in the full-duplex system, but the center apparatus 1 cannot receive signals while transmitting. The length of time involved for communication in the half-duplex system, therefore, is doubled. The receiving and transmitting of signals can be effected by using conductors in common, and therefore, the number of the conductors of the digital communication line can be reduced to two.

Figure 11:
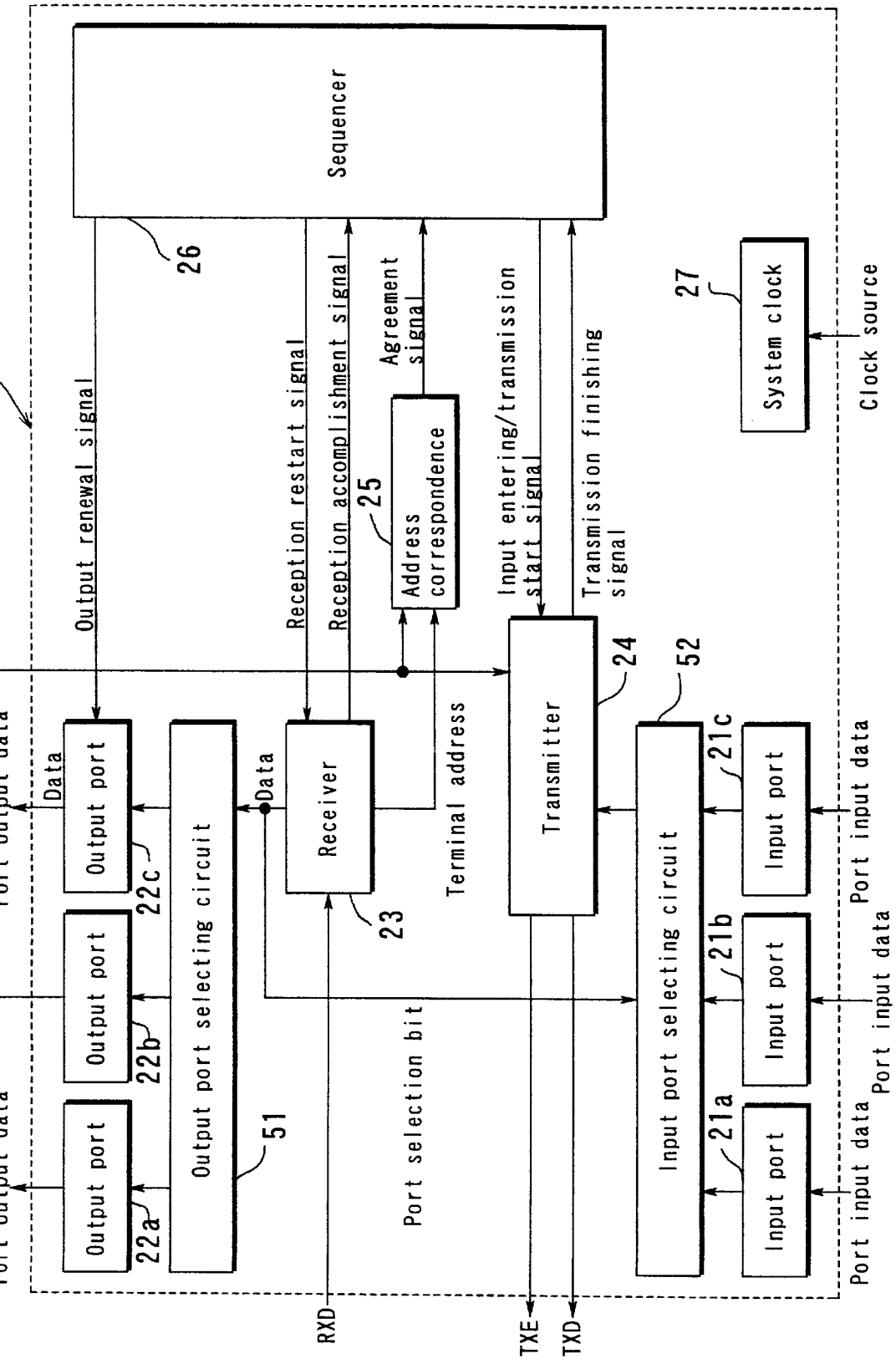
FIG. 11 shows some details of another example of terminal device.
Figure 12:
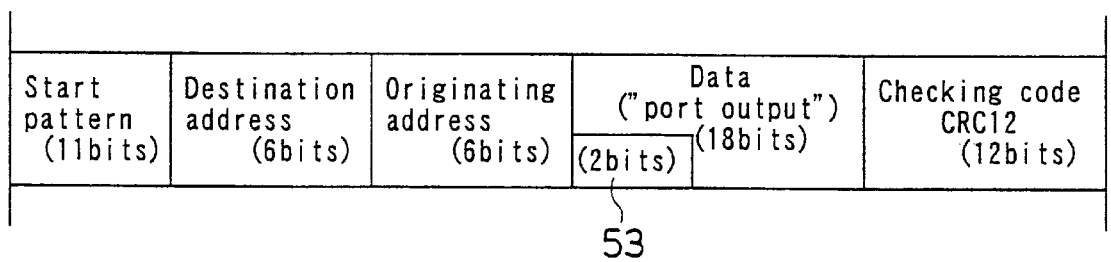
FIG. 12 shows another example of the format of a command packet.
Figure 13:
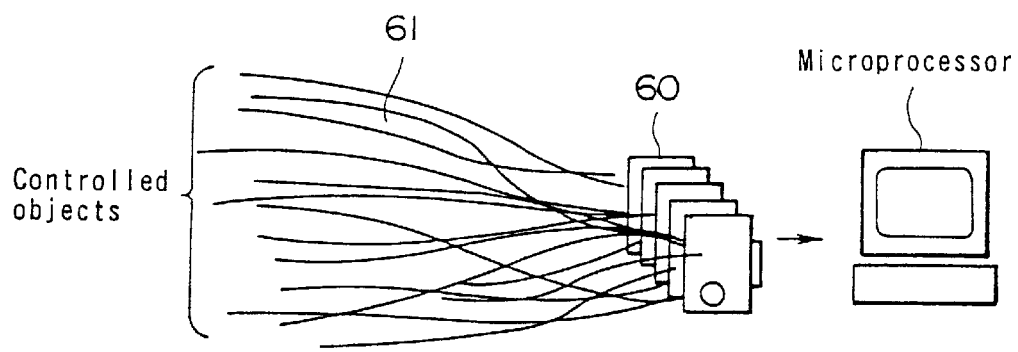
FIG. 13 illustrates a conventional data sending-and-receiving method.
Figure 14:
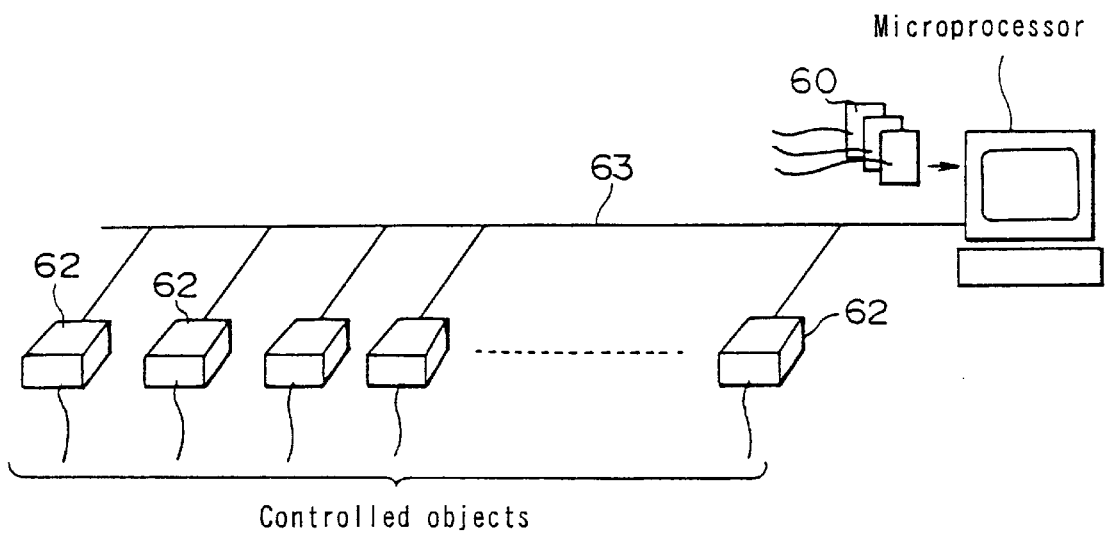
FIG. 14 illustrates another conventional data sending-and-receiving method.
Figure 15:
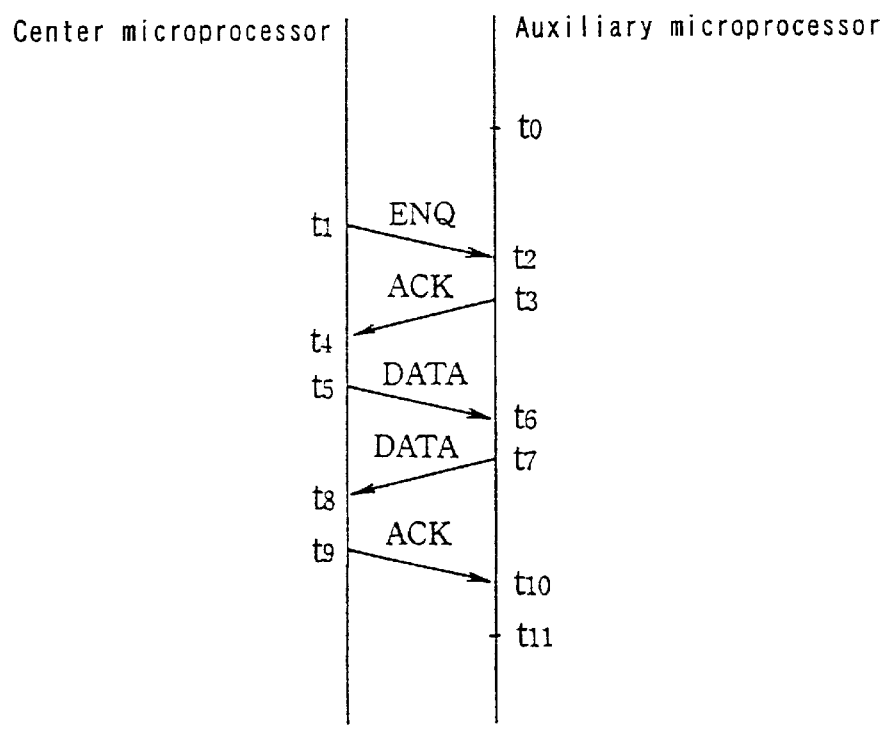
FIG. 15 shows how data can be sent and received according to the conventional method of FIG. 14.

III) Automatic, Cyclic Communication System According to a Third Embodiment:

FIGS. 11 and 12 illustrates another automatic, cyclic communication system in which each terminal device 2 has a plurality of input and output ports.

As shown in FIG. 11, the terminal device 2a has an output port selector 51 and an input port selector 52, and as shown in FIG. 12, each format of the command and response packets has a port selection bit 53.

For example, the terminal device 2 has three output ports 22a, 22b and 22c and three input ports 21a, 21b and 21c, and accordingly the command or response format contains a two-bit port selection 53 in the data column as seen from FIG. 12.

The common memory of the center apparatus has an auxiliary address area allotted for each output or input port 22a, 22b and 22c or 21a, 21b and 21c.

As may be understood above, an "electronic wiring system using automatic cyclic communication means" according to the present invention is so designed that the data bit group in the common memory of the center apparatus are structurally same as the data bit group in the I/O port of each terminal device, thereby permitting the direct handling of the data in each terminal device through the agency of the common memory.

This makes it easy to build an automation or computer-aided controlling system including "non-intelligent" terminal devices. Accordingly development, maintenance and trouble remedies can be facilitated, and can be performed by those less skilled than conventional automation or computer-aided controlling system including "intelligent" terminal devices. As a result, the term involved for development is substantially reduced; the manufacturing cost substantially reduced; and the wiring cost is substantially reduced, also because of possible least number of parts and conductors used.

What is claimed is:

1. In electronic wiring system using automatic cyclic communication means comprising:

a center apparatus comprising a state machine capable of controlling the receiving and-transmitting of data by driving associated circuits without recourse to communication control programs, and a memory to store data: and a plurality of terminal devices connected to said center apparatus via a digital communication line, each terminal device being capable of self-addressability, each data bit group of the memory of the center apparatus being structurally same as the data bit group of the I/P ports of each terminal device.

2. An electronic wiring system using automatic cyclic communication means according to claim 1 wherein each data bit group of the memory of the center apparatus is located in a divisional storage area allotted to each of the terminal devices.

3. An electronic wiring system using automatic cyclic communication means according to claim 1 or 2 wherein the memory of the center apparatus comprises registers individually driven for transmitting and receiving signals.

4. An electronic wiring system using automatic cyclic communication means according to claim 1 or 2 wherein each data bit group stored in an associated storage area allotted to each terminal device is composed in a field of receiving/transmitting unit, thereby permitting the receiving/transmitting of data in each field unit.

5. An electronic wiring system using automatic cyclic communication means according to claim 4 wherein each field unit is consisted of start pattern, destination address, originating address, data to be transferred and checking codes.

6. An electronic wiring system using automatic cyclic communication means according to claim 4 wherein the memory of the center apparatus is a dual-port RAM, or is equivalent thereto.

7. An electronic wiring system using automatic cyclic communication means according to claim 1 wherein the center apparatus comprises one or more IC chips.

8. An electronic wiring system using automatic cyclic communication means according to claim 1 wherein the "state machine" comprises at least a transmitting-and-receiving circuit, a sequencer to control data which are being transferred or received by the transmitting-and-receiving circuit and an arbiter circuit to control the reading of the data to be transmitted by the transmitting-and-receiving circuit from the memory of the center apparatus and the wiring of the data received by the transmitting-and-receiving circuit into the memory of the center apparatus.

* * * * *